United States Patent [19]
Okawa et al.

[11] Patent Number: 5,504,044
[45] Date of Patent: Apr. 2, 1996

[54] DIELECTRIC CERAMIC COMPOSITION FOR HIGH-FREQUENCY APPLICATIONS

[75] Inventors: Yoshihiro Okawa; Seiichiro Hirahara; Nobuyoshi Fujikawa, all of Kokubu, Japan

[73] Assignee: Kyocera Corporation, Kyoto, Japan

[21] Appl. No.: 337,609

[22] Filed: Nov. 10, 1994

[30] Foreign Application Priority Data

Nov. 10, 1993 [JP] Japan ................................ 5-280898
Feb. 21, 1994 [JP] Japan ................................ 6-022258
Mar. 29, 1994 [JP] Japan ................................ 6-203471

[51] Int. Cl.$^6$ .......................... C04B 35/00; C04B 35/02
[52] U.S. Cl. .................................. 501/1; 501/135
[58] Field of Search ........................... 501/1, 135

[56] References Cited

U.S. PATENT DOCUMENTS

| | | | |
|---|---|---|---|
| 4,830,995 | 5/1989 | Matsumoto et al. | 501/134 |
| 4,897,374 | 1/1990 | Matsumoto et al. | 501/134 |
| 5,011,803 | 4/1991 | Park et al. | 501/134 |
| 5,073,528 | 12/1991 | Matsumoto et al. | 501/134 |
| 5,229,101 | 7/1993 | Watanabe et al. | 501/134 |
| 5,432,135 | 7/1995 | Hirahara et al. | 501/139 |
| 5,449,652 | 9/1995 | Swartz et al. | 501/134 |

*Primary Examiner*—Deborah Jones
*Attorney, Agent, or Firm*—Loeb and Loeb

[57] ABSTRACT

A dielectric ceramic composition for high-frequency applications comprising a composite oxide containing at least Ba, Zn and W as metal elements. When the composition formula of the composite oxide is expressed in the form of molar ratios of the metal oxides, the molar ratios of the metal oxides lie within particular ranges. The ceramic composition exhibits a high dielectric constant and a large Q-value in high-frequency regions.

18 Claims, 2 Drawing Sheets

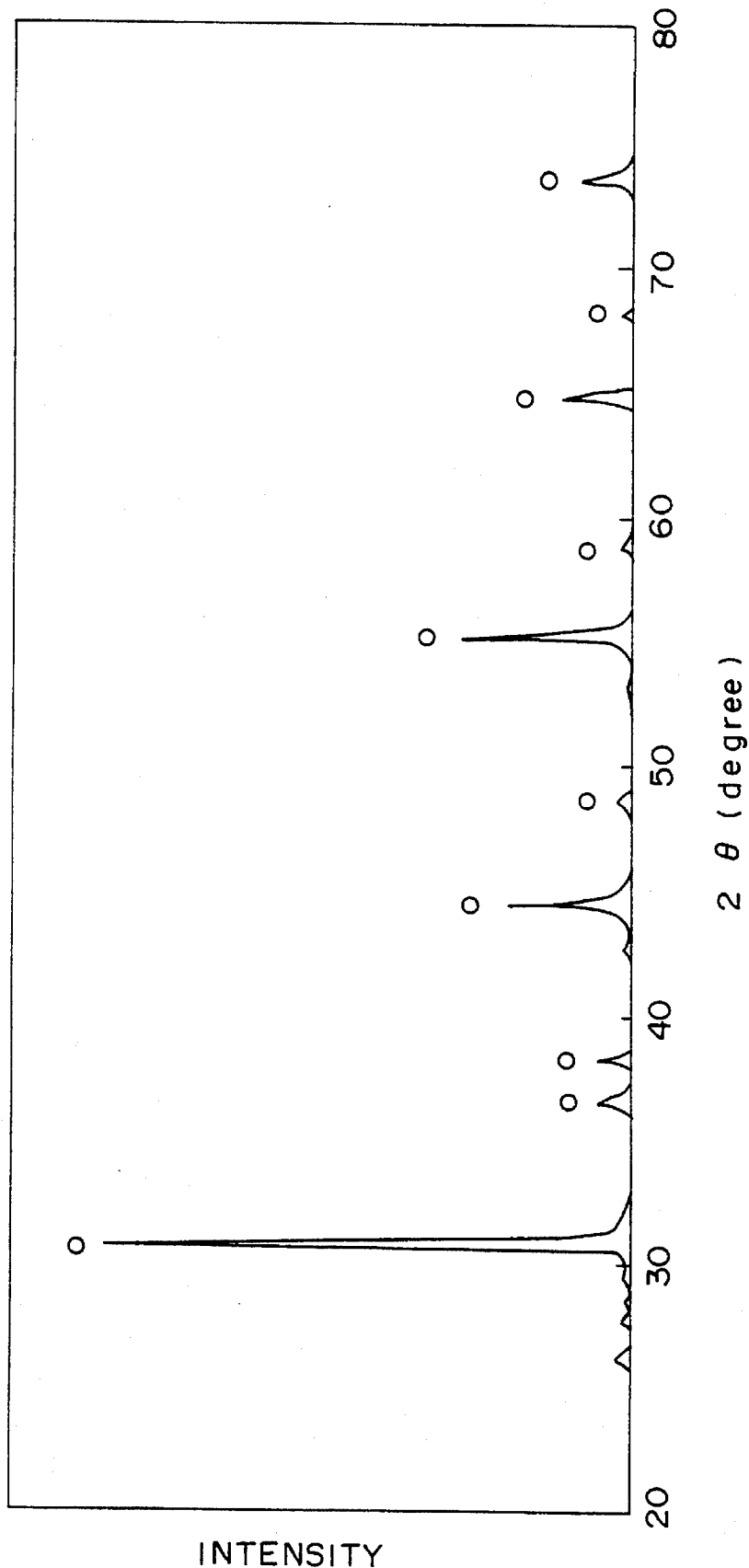

DIELECTRIC CERAMIC COMPOSITION FOR HIGH-FREQUENCY APPLICATIONS

BACKGROUND OF THE INVENTION

1. Field of the Invention

The present invention is concerned with a novel dielectric ceramic composition that exhibits a high dielectric constant and a high Q-value in high-frequency regions such as of microwaves and millimeter waves, and that is best suited for dielectric resonators, dielectric substrates, dielectric waveguide lines, dielectric antennas and capacitors.

2. Description of the Prior Art

Dielectric ceramics have been widely used for dielectric resonators and dielectric substrates for MICs in high-frequency regions such as of microwaves and millimeter waves.

As the dielectric ceramics of this kind, there have heretofore been known a $MgTiO_3$—$CaTiO_3$ type material and the like materials. These materials have dielectric constants of about 20 and Q-values reckoned as 1 GHz of about 20000.

As the dielectric ceramics are used in a variety of devices in recent years, however, they have been used in ever high frequency regions where improved dielectric properties and, particularly, high Q-values are required. With the above-mentioned conventional dielectric materials, however, high Q-values of a practical level have not yet been obtained.

SUMMARY OF THE INVENTION

In order to obtain an improved ceramic composition free from the above-mentioned problems, the present inventors have conducted extensive study and have found the fact that high Q-values and high electric constants are critically exhibited in the above-mentioned high-frequency regions by a composite oxide which contains Ba, Zn and W as metal elements at a particular composition ratio, by a composite oxide which further contains Nb in addition to Ba, Zn and W at a particular composition ratio, by a composite oxide which further contains Ta or Mg in addition to Ba, Zn, W and Nb at a particular composition ratio, and by a composite oxide which further contains Ta and Mg or Ta and Y in addition to Ba, Zn, W and Nb at a particular composition ratio, and have thus arrived at the present invention.

The object of the present invention is to provide a novel dielectric ceramic composition which exhibits a high Q-value and a high dielectric constant in a high-frequency region.

Another object of the present invention is to provide a dielectric ceramic composition which exhibits a high Q-value and a high dielectric constant, and of which the temperature coefficient of resonance frequency is suppressed to lie within a predetermined range close to zero.

According to the present invention, there is provided a novel dielectric ceramic composition of a composite oxide containing at least Ba, Zn and W as a metal element at a particular composition ratio.

According to a first aspect of the present invention, there is provided a dielectric ceramic composition for high-frequency applications comprising a composite oxide which contains at least Ba, Zn and W as metal elements, wherein when a composition formula of these metal elements by a molar ratio is expressed as $aBaO.bZnO.cWO_3$, said a, b and c satisfy the following relationships, $0.40 \leq a \leq 0.55$ $0.15 \leq b \leq 0.39$ $0.20 \leq c \leq 0.30$ $a+b+c=1.00$.

According to a second aspect of the present invention, there is provided a dielectric ceramic composition for high-frequency applications comprising a composite oxide which contains at least Ba, Zn, Nb and W as metal elements, wherein when a composition formula of these metal elements by a molar ratio is expressed as $aBaO.bZnO.cNb_2O_5.dWO_3$, said a, b, c and d satisfy the following relationships, $0.40 \leq a \leq 0.70$ $0.10 \leq b \leq 0.35$ $0 < c \leq 0.30$ $0 < d \leq 0.35$ $0 < e \leq 0.30$ $0.16 \leq c+e \leq 0.31$ $a+b+c+d+e=1.00$.

There is provided a dielectric ceramic composition for high-frequency applications comprising a composite oxide which contains at least Ba, Zn, Nb, W and Mg as metal elements, wherein when a composition formula of these metal elements by a molar ratio is expressed as $aBaO.bZnO.cNb_2O_5.dWO_3.eMgO$, said a, b, c, d and e satisfy the following relationships, $0.40 \leq a \leq 0.70$ $0 \leq b \leq 0.30$ $0 < c \leq 0.30$ $0 < d \leq 0.35$ $0 < e \leq 0.35$ $a+b+c+d+e=1.00$.

According to a fourth aspect of the present invention, there is provided a dielectric ceramic composition for high-frequency applications comprising a composite oxide which contains at least Ba, Zn, Nb, W, Mg and Ta as metal elements, wherein when a composition formula of these metal elements by a molar ratio is expressed as $aBaO.bZnO.cNb_2O_5.dWO_3.eMgO.fTa_2O_5$, said a, b, c, d, e and f satisfy the following relationships, $0.43 \leq a \leq 0.68$ $0.01 \leq b \leq 0.30$ $0 \leq c \leq 0.30$ $0 < d \leq 0.35$ $0 < e \leq 0.35$ $0 < f \leq 0.30$ $0.50 \leq (b+e)/(c+d+f) \leq 1.60$ $a+b+c+d+e+f=1.00$.

There is provided a dielectric ceramic composition for high-frequency applications comprising a composite oxide which contains at least Ba, Zn, Nb, W, Y and Ta as metal elements, wherein when a composition formula of these metal elements by a molar ratio is expressed as $aBaO.bZnO.cNb_2O_5.dWO_3.eY_2O_3.fTa_2O_5$, said a, b, c, d, e and f satisfy the following relationships, $0.40 \leq a \leq 0.70$ $0 < b \leq 0.35$ $0 \leq c \leq 0.30$ $0 < d \leq 0.35$ $0 < e \leq 0.30$ $0 \leq f \leq 0.30$ $0.20 \leq (b+e)/(c+d+f) \leq 1.66$ $a+b+c+d+e+f=1.00$.

BRIEF DESCRIPTION OF THE DRAWINGS

FIG. 2 is an X-ray chart of the three-component ceramic composition comprising $BaO\text{---}ZnO\text{---}WO_3$ according to an embodiment (Table 1, Sample No. 10) of the present invention.

DETAILED DESCRIPTION OF THE PREFERRED EMBODIMENTS

Figure 1:
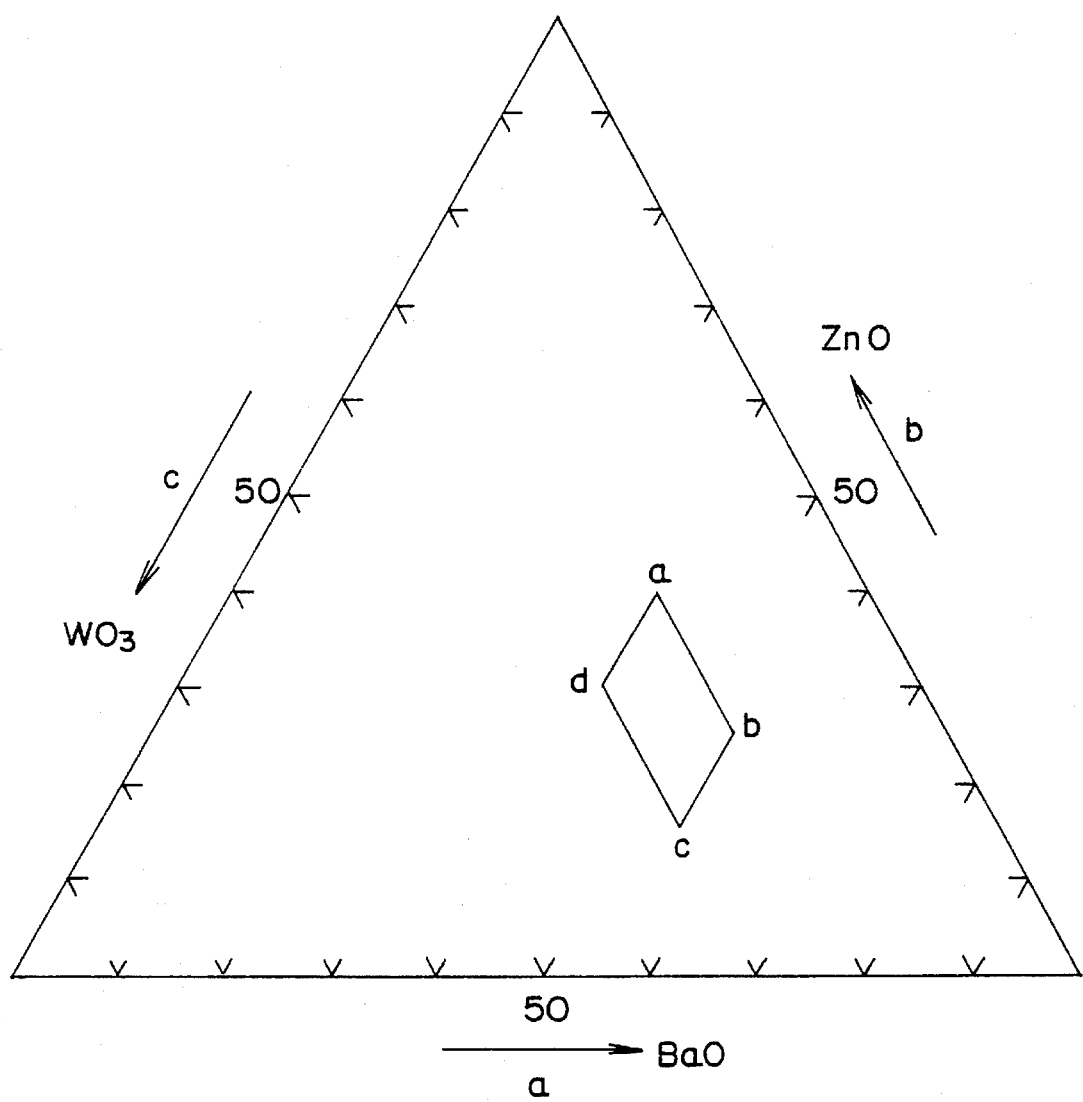
FIG. 1 is a three-way composition diagram of a three-component ceramic composition comprising $BaO\text{---}ZnO\text{---}WO_3$ of the present invention.

In a dielectric ceramic composition according to a first aspect of the present invention which comprises a composite oxide containing Ba, Zn and W as metal elements, when a composition formula of these metal elements by a molar ratio is expressed as $aBaO.bZnO.cWO_3$, it is necessary that a, b and c satisfy the following relationships, $0.40 \leq a \leq 0.55$ $0.15 \leq b \leq 0.39$ $0.20 \leq c \leq 0.30$ $a+b+c=1.00$.

When the molar ratio a of BaO is not larger than 0.40, the Q-value of the ceramic composition decreases and when the molar ratio a is not smaller than 0.55, it becomes difficult to sinter the ceramic composition. It is particularly desired that the molar ratio a lies within a range of $0.43 \leq a \leq 0.53$.

It is necessary that the molar ratio b of ZnO lies within a range of $0.15 \leq b \leq 0.39$. When the molar ratio b is not larger than 0.15, it becomes difficult to sinter the ceramic composition and the Q-value decreases. When the molar ratio b is not smaller than 0.39, the Q-value decreases. It is particularly desire that the molar ratio b lies within a range of $0.20 \leq b \leq 0.35$.

It is necessary that the molar ratio c of $WO_3$ lies not larger than $0.20 \leq c \leq 0.30$. When the molar ratio c is not larger than 0.20, the sintering property is lost and when the molar ratio c is not smaller than 0.30, the Q-value drops and the ceramic composition is poorly sintered. It is particularly desired that the molar ratio c lies within a range of $0.22 \leq c \leq 0.28$.

The dielectric material according to the first aspect of the present invention is a composite oxide containing Ba, Zn and W which chiefly form a perovskite-type crystal phase represented by $(Zn_{1/2}W_{1/2})O_3$ as a main crystal phase and may further contain other components that do not form the perovskite-type crystal phase as far as the composition lies within the above-mentioned range. The material having such a crystalline structure may be either in a polycrystalline form such as a sintered product or in a single crystalline form.

FIG. 1 is a three-way diagram illustrating the range of the ceramic composition according to the first aspect of the invention. In FIG. 1, a region surrounded by points a–b–c–d—a is a composition range of the present invention.

The ceramic according to the first aspect of the invention is prepared by using, for example, oxides of Ba, Zn and W or metal salts such as carbonates or nitrates that form oxides thereof upon firing as starting materials, weighing these materials so as to lie within the above-mentioned range, and wet-pulverizing the materials using a ball mill followed by dehydration and drying. Thereafter, the mixture is calcined at 500° to 1500° C. for 0.1 to 100 hours, the calcined product is introduced into the ball mill, mixed and pulverized together with a solvent and an organic binder, and is granulated. The calcined powder is press-molded into a predetermined shape under a predetermined pressure, and is fired in the open air at 91200° to 1750° C. for 0.1 to 200 hours to obtain a dielectric ceramic having a relative density of not smaller than 90%.

In a ceramic composition according to a second aspect of the present invention comprising a composite oxide which contains Ba, Zn, Nb and W as metal elements, when a composition formula of these metal elements by a molar ratio is expressed as $aBaO.bZnO.cNb_2O_5.dWO_3$, it is necessary that a, b, c and d satisfy the following relationships, $0.40 \leq a \leq 0.70$ $0.10 \leq b \leq 0.35$ $0 < c \leq 0.30$ $0 < d \leq 0.35$ $0.14 \leq c+d \leq 0.36$ $a+b+c+d=1.00$.

When the molar ratio a of BaO is not larger than 0.40, the Q-value of the ceramic composition decreases 10 and it becomes difficult to sinter the ceramic composition. When the molar ratio a is not smaller than 0.7, it becomes difficult to sinter the ceramic composition. It is particularly desired that the molar ratio a lies within a range of $0.44 \leq a \leq 0.63$.

When the molar ratio b of ZnO is not larger than 0.10, it becomes difficult to sinter the ceramic composition and the Q-value decreases, too. When the molar ratio b is not smaller than 0.35, the Q-value decreases and it becomes difficult to sinter the ceramic composition. It is particularly desired that the molar ratio b lies within a range of $0.16 \leq b \leq 0.35$.

When the molar ratio c of $Nb_2O_5$ is not smaller than 0.30, the Q-value decreases and it becomes difficult to sinter the ceramic composition.

When the molar ratio d of $WO_3$ is not smaller than 0.35, the Q-value decreases and the ceramic composition is poorly sintered. It is particularly desired that the molar ratio d lies within a range of $0.003 \leq d \leq 0.25$.

Moreover, the value c+d is selected to be $0.14 \leq c+d \leq 0.36$. This is because, when the value c+d lies outside this range, the Q-value decreases and the ceramic composition is poorly sintered.

The dielectric material according to the second aspect of the present invention is a composite oxide containing Ba, Zn, Nb and W, and in which a perovskite-type crystal phase serves as a main crystal phase and may contain other components other than those of the perovskite-type crystal phase. The material having such a crystalline structure may be either in a polycrystalline form such as a sintered product or in a single crystalline form.

The ceramic according to the second aspect of the invention is prepared by using, for example, oxides of Ba, Zn, Nb and W or metal salts such as carbonates or nitrates that form oxides thereof upon firing as starting materials, weighing these materials so as to lie within the above-mentioned range, and wet-pulverizing the materials using a ball mill followed by dehydration and drying. Thereafter, the mixture is calcined at 500° to 1500° C. for 0.1 to 100 hours, the calcined product is introduced into the ball mill, mixed and pulverized together with a solvent and an organic binder, and is granulated. Or, the starting powder of the oxides of Ba, Zn and Nb or metal salts such as carbonates or nitrates that form oxides thereof upon firing, and the oxides of Ba, Zn and W or metal salts such as carbonates or nitrates that form oxides thereof upon firing, are prepared, pulverized and are calcined separately from each other, and are then introduced together into a ball mill where they are mixed and pulverized together with the solvent and the organic binder, followed by granulation. The calcined powder is press-molded into a predetermined shape under a predetermined pressure, and is fired in the open air at 1200° to 1750° C. for 0.1 to 200 hours to obtain a dielectric ceramic having a relative density of not smaller than 90%.

In a ceramic composition according to a third aspect of the present invention comprising a composite oxide which contains Ba, Zn, Nb, W and Ta or Mg as metal elements, when a composition formula of these metal elements by a molar ratio is expressed as $aBaO \cdot bZnO \cdot cNb_2O_5 \cdot dWO_3 \cdot eTa_2O_5$ and $aBaO \cdot bZnO \cdot cNb_2O_5 \cdot dWO_3 \cdot eMgO$, it is necessary that a, b, c, d and e satisfy the following relationships, $0.40 \leq a \leq 0.70$ $0.10 \leq b \leq 0.35$ $0 < c \leq 0.30$ $0 < d \leq 0.35$ $0 < e \leq 0.30$ $0.16 \leq c+e \leq 0.31$ $a+b+c+d+e=1.00$.

in the case of the former composition, i.e., in the case of the ceramic composition which contains Ta in addition to Ba, Zn, Nb and W as metal elements.

When the molar ratio a of BaO is not larger than 0.40, the Q-value of the ceramic composition decreases and it becomes difficult to sinter the ceramic composition. When the molar ratio a is not smaller than 0.7, it becomes difficult to sinter the ceramic composition. It is particularly desired that the molar ratio a lies within a range of $0.44 \leq a \leq 0.63$.

When the molar ratio b of ZnO is not larger than 0.10, it becomes difficult to sinter the ceramic composition and the Q-value decreases. When the molar ratio b is not smaller than 0.35, the Q-value decreases and it becomes difficult to sinter the ceramic composition. It is particularly desired that the molar ratio b lies within a range of $0.16 \leq b \leq 0.35$.

When the molar ratio c of $Nb_2O_5$ is not smaller than 0.30, the Q-value decreases and it becomes difficult to sinter the ceramic composition.

When the molar ratio d of $WO_3$ is not smaller than 0.35, the Q-value decreases and the ceramic composition is poorly sintered.

It is particularly desired that the molar ratio d lies within a range of $0.003 \leq d \leq 0.25$.

When the molar ratio e of $Ta_2O_5$ is not smaller than 0.30, it becomes difficult to sinter the ceramic composition.

The value c+e is selected to lie $0.16 \leq c+e \leq 0.31$. This is because when the value c+e lies outside this range, the Q-value decreases and the ceramic composition is poorly sintered.

Next, in the case of the latter ceramic composition containing Mg in addition to Ba, Zn, Nb and W as metal elements, it is necessary that a, b, c, d and e satisfy the following relations, $0.40 \leq a \leq 0.70$ $0 < b \leq 0.30$ $0 < c \leq 0.30$ $0 < d \leq 0.35$ $0 < e \leq 0.35$ $a+b+c+d+e=1.00$.

When the molar ratio a of BaO is not larger than 0.40, the Q-value decreases. When the molar ratio a is not smaller than 0.70, it becomes difficult to sinter the ceramic composition. It is particularly desired that the molar ratio a lies within a range of $0.43 \leq a \leq 0.67$.

When the molar ratio b of ZnO is 0, the Q-value decreases. When the molar ratio b is not smaller than 0.30, not only the Q-value decreases but it becomes difficult to sinter the ceramic composition as well. It is particularly desired that the molar ratio b lies within a range of $0.02 \leq b \leq 0.27$.

When the molar ratio c of $Nb_2O_5$ is 0, the Q-value decreases. When the molar ratio c is not smaller than 0.30, not only the Q-value decreases but it becomes difficult to sinter the ceramic composition as well. It is desired that the molar ratio c lies within a range of $0.02 \leq c \leq 0.27$.

When the molar ratio d of $WO_3$ is 0, the Q-value decreases. When the molar ratio d is not smaller than 0.35, not only the Q-value decreases but it becomes difficult to sinter the ceramic composition as well. It is particularly desired that the molar ratio d lies within a range of $0.005 \leq d \leq 0.32$.

When the molar ratio e of MgO is 0, the Q-value decreases. When the molar ratio e is not smaller than 0.35, not only the Q-value decreases but it becomes difficult to sinter the ceramic composition as well. It is particularly desired that the molar ratio e lies within a range of $0.025 \leq e \leq 0.32$.

The dielectric material according to the aspect of the present invention is a composite oxide containing Ba, Zn, Nb, W and Ta or containing Ba, Zn, Nb, W and Mg, which chiefly comprises the components of perovskite-type crystal phase and may further comprise components other than those of the perovskite-type crystal phase.

The material having such a crystalline structure may be either in a polycrystalline form such as a sintered product or in a single crystalline form.

The ceramic according to the second aspect of the invention is prepared by using, for example, oxides of Ba, Zn, Nb, W and Ta or Mg or metal salts such as carbonates or nitrates that form oxides thereof upon firing as starting materials, weighing these materials so as to lie within the above-mentioned range, and wet-pulverizing the materials using a ball mill followed by dehydration and drying. Thereafter, the mixture is calcined at 500° to 1500° C. for 0.1 to 100 hours, the calcined product is introduced into the ball mill, mixed and pulverized together with a solvent and an organic binder, and is granulated. Or, the starting powder of the oxides of Ba, Zn, Nb and Ta or of the oxides of Ban Z, Nb and Mg or metal salts such as carbonates or nitrates that form oxides thereof upon firing, are prepared, pulverized and are calcined separately from each other, and are then introduced together into a ball mill where they are mixed and pulverized together with the solvent and the organic binder, followed by granulation. The calcined powder is press-molded into a predetermined shape under a predetermined pressure, and is fired in the open air at 1200° to 1750° C. for 0.1 to 200 hours to obtain a dielectric ceramic having a relative density of not smaller than 90%.

In a ceramic composition according to a fourth aspect of the present invention comprising a composite oxide which contains at least Ba, Zn, Nb, W, as well as Mg and Ta or Y and Ta as metal elements, when a composition formula of these metal elements by a molar ratio is expressed as $aBaO \cdot bZnO \cdot cNb_2O_5 \cdot dWO_3 \cdot eMgO \cdot fTa_2O_5$ and $aBaO \cdot bZnO \cdot cNb_2O_5 \cdot dWO_3 \cdot eY_2O_3 \cdot fTa_2O_5$, it is necessary that a, b, c, d, e and f satisfy the following relationships, $0.43 \leq a \leq 0.68$ $0.01 \leq b \leq 0.30$ $0 \leq c \leq 0.30$ $0 < d \leq 0.35$ $0 < e \leq 0.35$ $0 < f \leq 0.30$ $0.50 \leq (b+e)/(c+d+f) \leq 1.60$ $a+b+c+d+e+f=1.00$.

When the molar ratio a of BaO is not larger than 0.43 or is not smaller than 0.68, the ceramic composition is poorly sintered. It is particularly desired that the molar ratio a lies within a range of $0.52 \leq a \leq 0.62$.

When the molar ratio b of ZnO is not larger than 0.01, the Q-value decreases. When the molar ratio b is not smaller than 0.30, the ceramic composition is poorly sintered. It is particularly desired that the molar ratio b lies within a range of $0.08 \leq b \leq 0.21$.

When the molar ratio c of $Nb_2O_5$ is not smaller than 0.30, the ceramic composition is poorly sintered. It is particularly desired that the molar ratio c lies within a range of $0.001 \leq c \leq 0.11$.

When the molar ratio d of $WO_3$ is not smaller than 0.35, the ceramic composition is poorly sintered. When the molar ratio d is 0, the Q-value and dielectric constant decrease. It is particularly desired that the molar ratio d lies within a range of $0.001 \leq d \leq 0.150$.

When the molar ratio e of MgO is not smaller than 0.35, the ceramic composition is poorly sintered. When the molar ratio e is 0, the Q-value and dielectric constant decrease. It is particularly desired that the molar ratio e lies within a range of $0.001 \leq e \leq 0.150$.

When the molar ratio f of $Ta_2O_5$ is not smaller than 0.30, the ceramic composition is poorly sintered. When the molar ratio f is 0, the Q-value and the dielectric constant decrease. It is particularly desired that the molar ratio f lies within a range of $0.08 \leq f \leq 0.20$.

Furthermore, a range is selected to be $0.50 \leq (b+e)/(c+d+f) \leq 1.60$. This is because outside this range, the Q-value decreases and the ceramic composition is poorly sintered.

The above-mentioned dielectric material is a composite oxide containing Ba, Zn, Nb, W, Mg and Ta which chiefly form a perovskite-type crystal phase and may further contain other components that do not form the perovskite-type crystal phase. The material having such a crystalline structure may be either in a polycrystalline form such as a sintered product or in a single crystalline form. When the dielectric ceramic contains components that do not form the perovskite-type crystal phase, it is desired that an intensity ratio of a main peak of the crystal phase other than the perovskite-type crystal phase to the main peak of the perovskite-type crystal phase is not larger than 10% as determined by the X-ray analysis.

Moreover, at least one or more of the elements such as Al, Fe, Pb, Mn, Si, V, La, Sb, Ca and Zr or compounds thereof may be contained in an amount of not larger than 10 mol % with respect to the whole amount.

The ceramic according to the present invention is prepared by using, for example, oxides of Ba, Zn, Nb, Mg, W and Ta or metal salts such as carbonates or nitrates that form oxides thereof upon firing as starting materials, weighing these materials so as to lie within the above-mentioned range, and wet-pulverizing the materials using a ball mill followed by dehydration and drying. It is further allowable to add at least one or more elements such as Ni, Co, Y, Al, Fe, Pb, Mn, Si, V, La, Sb, Ca and Zr or compounds thereof in an amount not larger than 10 Mol % with respect to the whole amount in addition to Ba, Zn, Nb, Mg, W and Ta.

Thereafter, the mixture is calcined at 500° to 1500° C. for 0.1 to 100 hours, the calcined product is introduced into the ball mill, mixed and pulverized together with a solvent and an organic binder, and is granulated. The calcined powder is press-molded into a predetermined shape under a predetermined pressure, and is fired in an atmosphere containing oxygen in an amount of not smaller than 1% by volume at 1200° to 1750° C. for 0.1 to 200 hours to obtain a dielectric ceramic.

In the case of the latter ceramic composition which contains at least Ba, Zn, Nb, W, as well as Y and Ta, when a composition formula of these metal elements by a molar ratio is expressed as $aBaO \cdot bZnO \cdot cNb_2O_5 \cdot dWO_3 \cdot eY_2O_3 \cdot fTa_2O_5$, it is necessary that a, b, c, d, e and f satisfy the following relationships, $0.40 \leq a \leq 0.70$ $0 < b \leq 0.35$ $0 \leq c \leq 0.30$ $0 < d \leq 0.35$ $0 < e \leq 0.30$ $0 \leq f \leq 0.30$ $0.20 \leq (b+e)/(c+d+f) \leq 1.66$ $a+b+c+d+e+f=1.00$.

When the molar ratio a of BaO is not larger than 0.40, Q-value decreases and it becomes difficult to sinter the ceramic composition. When the molar ratio a is not smaller than 0.70, it becomes difficult to sinter the ceramic composition. It is desired that the molar ratio a lies within a range of $0.45 \leq a \leq 0.65$ and, particularly, within a range of $0.48 \leq a \leq 0.62$.

When the molar ratio b of ZnO is not smaller than 0.35, the Q-value decreases and it becomes difficult to sinter the ceramic composition. It is desired that the molar ratio b lies within a range of $0.010 \leq b \leq 0.30$ and, particularly, within a range of $0.030 \leq b \leq 0.25$.

When the molar ratio c of $Nb_2O_5$ is not smaller than 0.30, the Q-value decreases and it become difficult to sinter the ceramic composition. It is desired that the molar ratio c lies within a range of $0.010 \leq c \leq 0.25$ and, particularly, within a range of $0.030 \leq c \leq 0.20$.

When the molar ratio d of $WO_3$ is not smaller than 0.35, the Q-value decreases and the ceramic composition is poorly sintered. It is desired that the molar ratio d lies within a range of $0.010 \leq d \leq 0.30$ and, particularly, within a range of $0.030 \leq d \leq 0.25$.

When the molar ratio e of $Y_2O_3$ is not smaller than 0.30, the Q-value decreases. It is desired that the molar ratio e lies within a range of $0.010 \leq e \leq 0.25$ and, particularly, within a range of $0.030 \leq e \leq 0.20$.

When the molar ratio f of $Ta_2O_5$ is not smaller than 0.30, the Q-value decreases. It is desired that the molar ratio f lies within a range of $0 \leq f \leq 0.25$ and, particularly, within a range of $0.05 \leq f \leq 0.23$. A range $0.20 \leq (b+e)/(c+d+f) \leq 1.66$ is specified. This is because outside this range, the Q-value decreases and the ceramic composition is poorly sintered.

The dielectric material is a composite oxide containing Ba, Y, Zn, Nb, W, and Ta which chiefly form a perovskite-type crystal phase and may further contain other components that do not form the perovskite-type crystal phase. The material having such a crystalline structure may be either in a polycrystalline form such as a sintered product or a single crystalline form.

The ceramic according to the present invention is prepared by using, for example, oxides of Ba, Y, Zn, Nb, W and Ta or metal salts such as carbonates or nitrates that form oxides thereof upon firing as starting materials, weighing these materials so as to lie within the above-mentioned range, and wet-pulverizing the materials using a ball mill followed by dehydration and drying. It is further allowable to add oxides such as of Ni, Co, Al, Fe, Pb, Mn, Si, V, Zr, La, Sb and Ca in an amount not larger than 10 mol % with respect to the whole amount in addition to Ba, Y, Zn, Nb, W and Ta.

Thereafter, the mixture is calcined at 500° to 1500° C. for 0.1 to 100 hours, the calcined product is introduced into the ball mill, mixed and pulverized together with a solvent and an organic binder, and is granulated. Or, a starting powder to which are added oxides of Ba, Y, Nb and Ta or metal salts such as carbonates or nitrates that form oxides thereof upon firing, and oxides of Ba, Zn and W or metal salts such as carbonates or nitrates that form oxides thereof upon firing, are prepared, pulverized and calcined separately from each other, and are introduced into a ball mill where they are mixed and pulverized together with a solvent and an organic binder, followed by granulation. The calcined powder is press-molded into a predetermined shape under a predetermined pressure, and is fired in an open air at 1200° to 1750° C. for 0.1 to 200 hours to obtain a dielectric ceramic.

The dielectric ceramic composition for high-frequency applications of the present invention exhibits a high Q-value in a high-frequency region yet maintaining a relatively high dielectric constant.

In particular, the ceramic compositions according to the second, third and fourth aspects of the present invention exhibit temperature coefficients $\tau f$ of resonance frequency that are suppressed to lie within a predetermined range close to zero.

The invention will now be described by way of Examples.

EXAMPLE 1

Powders of $BaCO_3$, $ZnO$ and $WO_3$ having purities of not lower than 99% were used as starting materials, weighed at ratios shown in Table 1, introduced into a ball mill lined with a rubber together with the water, and were wet-mixed using $ZrO_2$ balls having a diameter of 10 mm. The mixture was then dehydrated, dried, and was calcined at 1200° C. for two hours. The calcined product was wet-pulverized in the ball mill together with the water and an organic binder.

The pulverized product was then dried and was granulated through a sieve of mesh #50. The powder was then molded into a disk of a size of 20 mm in diameter×10 mm under a pressure of 1 ton/cm². The disk was then fired under the conditions of 1400° to 1500° C. for two hours to obtain a ceramic sample. The ceramic sample was machined to obtain a cylinder measuring 14 mm in diameter×7 mm.

The thus obtained ceramic sample was measured for its dielectric constant ($\epsilon r$) at frequencies of 5 to 7 GHz and for its Q-value by a dielectric resonance method, and was further measured for its change in the resonance frequency depending upon the temperature over a temperature range of from 25° C. to 85° C. to calculate the temperature coefficient ($\tau f$) at resonance frequency. The Q-value was converted into a Q-value at 1 GHz relying upon a relationship that "Q-value×measuring frequency f=constant" that holds in microwave dielectric in general. The results were as shown in Table 1.

TABLE 1

| Sample No. | aBaO.bZnO.cWO_3 | | | Dielectric constant | |
|---|---|---|---|---|---|
| | a | b | c | εr | Qf |
| 1 | 0.45 | 0.30 | 0.25 | 24 | 50000 |
| 2 | 0.55 | 0.25 | 0.20 | 24 | 27000 |
| 3 | 0.50 | 0.20 | 0.30 | 22 | 23000 |
| *4 | 0.60 | 0.15 | 0.25 | — | <1000 |
| *5 | 0.50 | 0.35 | 0.15 | poorly sintered | |
| *6 | 0.40 | 0.25 | 0.35 | poorly sintered | |
| *7 | 0.35 | 0.40 | 0.25 | — | <1000 |

TABLE 1-continued

| Sample No. | aBaO.bZnO.cWO_3 | | | Dielectric constant | |
|---|---|---|---|---|---|
| | a | b | c | εr | Qf |
| *8 | 0.65 | 0.25 | 0.10 | poorly sintered | |
| *9 | 0.50 | 0.10 | 0.40 | poorly sintered | |
| 10 | 0.50 | 0.25 | 0.25 | 28 | 82000 |
| 11 | 0.475 | 0.275 | 0.25 | 27 | 61000 |
| 12 | 0.50 | 0.225 | 0.275 | 24 | 63000 |
| 13 | 0.525 | 0.225 | 0.250 | 24 | 77000 |
| 14 | 0.50 | 0.275 | 0.225 | 25 | 74000 |
| 15 | 0.55 | 0.20 | 0.25 | 24 | 29000 |
| 16 | 0.50 | 0.30 | 0.20 | 22 | 23000 |
| 17 | 0.40 | 0.35 | 0.25 | 24 | 25000 |
| *18 | 0.40 | 0.45 | 0.15 | — | <1000 |
| 19 | 0.43 | 0.29 | 0.28 | 26 | 56000 |
| 20 | 0.53 | 0.25 | 0.22 | 25 | 51000 |
| 21 | 0.52 | 0.20 | 0.28 | 25 | 40000 |
| 22 | 0.43 | 0.35 | 0.22 | 25 | 40000 |
| 23 | 0.50 | 0.26 | 0.24 | 28 | 79000 |

Samples marked with * lie outside the scope of the invention.

According to Table 1, the samples Nos. 4 to 9 and 18 whose compositions fell outside the scope of the present invention exhibited Q-value that were smaller than 1000 and were poorly sintered. On the other hand, the samples of the present invention exhibited dielectric constants of 22 to 28 and Q-values of larger than 23000.

The ceramic of sample No. 10 was subjected to the X-ray analysis. The results were as shown in FIG. 2. It will be understood from FIG. 2 that the peaks marked with an open circle are due to the perovskite-type crystal structure having a composition formula of presumably $Ba(Zn_{1/2}W_{1/2})O_3$.

EXAMPLE 2

Powders of $BaCO_3$, $ZnO$, $Nb_2O_5$ and $WO_3$ having purities of not lower than 99% were used as starting materials, weighed at ratios shown in Table 1, introduced into a ball mill lined with a rubber together with the water, and were wet-mixed using $ZrO_2$ balls having a diameter of 10 mm. The mixture was then dehydrated, dried, and was calcined at 1200° C. for two hours. The calcined product was wet-pulverized in the ball mill together with the water and an organic binder.

The pulverized product was then dried and was granulated through a sieve of mesh #50. The powder was then molded into a disk of a size of 20 mm in diameter×10 mm under a pressure of 1 ton/cm². The disk was then fired under the conditions of 1350° to 1550° C. for two hours to obtain a ceramic sample. The ceramic sample was machined to obtain a cylinder measuring 13 mm in diameter×6 mm.

The thus obtained ceramic sample was measured for its dielectric constant ($\epsilon r$) at frequencies of 4 to 7 GHz and for its Q-value by a dielectric resonance method, and was further measured for its change in the resonance frequency depending upon the temperature over a temperature range of from 25° C. to 85° C. to calculate the temperature coefficient ($\tau f$) at resonance frequency. The Q-value was converted into a Q-value at 1 GHz relying upon a relationship that "Q-value×measuring frequency f=constant" that holds in microwave dielectrics in general. The results were as shown in Table 2.

TABLE 2

| Sample No. | aBaO.bZnO.CNb$_2$O$_5$.dWO$_3$ | | | | | Dielectric constant $\epsilon r$ | Q-value | $\zeta f$ ppm/°C. |
|---|---|---|---|---|---|---|---|---|
| | a | b | c | d | c+d | | | |
| 24 | 0.400 | 0.290 | 0.001 | 0.309 | 0.310 | 22.3 | 45000 | −43.7 |
| 25 | 0.500 | 0.249 | 0.002 | 0.249 | 0.251 | 25.8 | 63000 | −42.0 |
| 26 | 0.600 | 0.199 | 0.199 | 0.002 | 0.201 | 39.1 | 112000 | 26.8 |
| 27 | 0.700 | 0.155 | 0.144 | 0.001 | 0.145 | 36.7 | 49000 | 37.3 |
| 28 | 0.554 | 0.100 | 0.163 | 0.183 | 0.346 | 27.9 | 47000 | −21.3 |
| 29 | 0.576 | 0.212 | 0.154 | 0.058 | 0.212 | 30.0 | 67000 | 0 |
| 30 | 0.440 | 0.350 | 0.010 | 0.200 | 0.210 | 22.5 | 50000 | −40.6 |
| 31 | 0.537 | 0.160 | 0.300 | 0.003 | 0.303 | 39.5 | 54000 | 29.0 |
| 32 | 0.483 | 0.163 | 0.004 | 0.350 | 0.354 | 23.6 | 47000 | −38.5 |
| 33 | 0.545 | 0.227 | 0.091 | 0.137 | 0.228 | 27.0 | 65000 | −9.8 |
| 34 | 0.571 | 0.214 | 0.143 | 0.072 | 0.215 | 28.9 | 92000 | −7.9 |
| 35 | 0.588 | 0.216 | 0.186 | 0.010 | 0.196 | 37.0 | 94000 | 23.4 |
| *36 | 0.350 | 0.150 | 0.200 | 0.300 | 0.500 | poorly sintered | | |
| *37 | 0.750 | 0.150 | 0.050 | 0.050 | 0.100 | poorly sintered | | |
| *38 | 0.450 | 0.050 | 0.250 | 0.250 | 0.500 | poorly sintered | | |
| *39 | 0.400 | 0.400 | 0.100 | 0.100 | 0.200 | poorly sintered | | |
| *40 | 0.400 | 0.150 | 0.350 | 0.100 | 0.450 | poorly sintered | | |
| *41 | 0.420 | 0.120 | 0.090 | 0.370 | 0.460 | poorly sintered | | |

Samples marked with * lie outside the scope of the invention.

According to Table 2, the samples Nos. 36 to 41 whose compositions fell outside the scope of the present invention were poorly sintered. On the other hand, the samples of the present invention exhibited dielectric constants of 22 to 40 and Q-values of larger than 45000.

EXAMPLE 3

Powders of BaCO$_3$, ZnO, Nb$_2$O$_5$, WO$_3$ and Ta$_2$O$_5$ having purities of not lower than 99% were used as starting materials, weighed at ratios shown in Table 3, and were then treated in the same manner as in Example 2 to obtain a ceramic sample. The ceramic sample was measured for its dielectric constant, temperature coefficient (τf) at resonance frequency and Q-value in the same manner as in Example 2. The results were as shown in Table 3.

| Sample No. | aBaO · bZnO · cNb$_2$O$_5$ · dWO$_3$ · eTa$_2$O$_5$ | | | | | | Dielectric constant $\epsilon r$ | Q-value | τf ppm/°C. |
|---|---|---|---|---|---|---|---|---|---|
| | a | b | c | d | e | c+e | | | |
| 42 | 0.535 | 0.205 | 0.255 | 0.004 | 0.001 | 0.256 | 38.2 | 61000 | 28.1 |
| 43 | 0.551 | 0.221 | 0.091 | 0.007 | 0.130 | 0.221 | 34.4 | 74000 | 11.7 |
| 44 | 0.601 | 0.190 | 0.004 | 0.005 | 0.200 | 0.204 | 29.1 | 105000 | −0.5 |
| 45 | 0.498 | 0.195 | 0.003 | 0.004 | 0.300 | 0.303 | 25.3 | 41000 | 19.2 |
| 46 | 0.540 | 0.170 | 0.090 | 0.130 | 0.070 | 0.160 | 28.2 | 77000 | −5.6 |
| 47 | 0.630 | 0.160 | 0.002 | 0.008 | 0.200 | 0.202 | 26.7 | 52000 | −4.4 |
| *48 | 0.440 | 0.140 | 0.010 | 0.010 | 0.400 | 0.410 | poorly sintered | | |
| *49 | 0.350 | 0.151 | 0.176 | 0.303 | 0.020 | 0.196 | poorly sintered | | |
| *50 | 0.750 | 0.050 | 0.070 | 0.080 | 0.050 | 0.120 | poorly sintered | | |
| *51 | 0.470 | 0.400 | 0.050 | 0.030 | 0.050 | 0.100 | poorly sintered | | |
| *52 | 0.410 | 0.100 | 0.350 | 0.050 | 0.090 | 0.440 | poorly sintered | | |
| *53 | 0.410 | 0.110 | 0.030 | 0.400 | 0.050 | 0.080 | poorly sintered | | |

Samples marked with * lie outside the scope of the invention.

According to Table 3, the samples Nos. 48 to 53 whose compositions fell outside the scope of the present invention were poorly sintered. The samples of the present invention, on the other hand, exhibited dielectric constants of 25 to 39 and Q-value of larger than 41000.

The present inventors have further prepared a starting powder to which are added oxides of Ba, Zn, Nb and Ta or metal salts such as carbonates and nitrates that form oxides upon firing, as well as oxides of Ba, Zn and W or metal salts of carbonates or nitrates that form oxides upon firing separately from each other, and have pulverized and calcined them separately from each other, introduced the calcined products into a ball mill, mixed and pulverized them together with a solvent and an organic binder, molded the mixture, and fired the molded article in an open atmosphere. The inventors have confirmed that excellent dielectric properties are exhibited provided the compositions lie within the scope of the present invention.

EXAMPLE 4

Powders of BaCO$_3$, ZnO, MgCO$_3$, Nb$_2$O$_5$ and WO$_3$ having purities of not lower than 99% were used as starting materials, weighed at ratios shown in Table 3, introduced into a ball mill lined with a rubber together with the water, and were wet-mixed together. The mixture was then dehydrated, dried, and was calcined at 1200° C. for two hours. The calcined product was introduced into the ball mill and was wet-pulverized together with the water and an organic binder.

The pulverized product was then dried, granulated through a sieve of mesh #50, and the resulting powder was molded into a disk measuring 12 mm in diameter×8 mm under a pressure of 1 ton/cm$^2$. The disk was fired under the conditions of 1400° to 1650° C. for 6 hours to obtain a ceramic sample which was then machined to obtain a disk measuring 8 mm in diameter×5 mm.

The thus obtained ceramic sample was measured for its dielectric constant ($\epsilon r$) at frequencies of 7 to 12 GHz and for its Q-value by a dielectric resonance method. A temperature coefficient ($\tau f$) at resonance frequency was further calculated from a change in the resonance frequency over a temperature range of from 25° C. to 85° C. The Q-value was converted into a Q-value at 1GHz relying upon a relationship that "Q-value× measuring frequency f=constant that holds in microwave dielectrics in general. The results were as shown in Table 4.

According to Table 4, the samples Nos. 68 to 77 whose compositions fell outside the scope of the present invention exhibited Q-values of smaller than 1000 and were poorly sintered. The samples of the present invention, on the other hand, exhibited dielectric constants of 15 to 40, Q-values of larger than 45000, and a temperature coefficient t resonance frequency of not larger than 36.8 ppm/°C. in absolute value. Besides, the samples of the present invention exhibited a temperature coefficient at resonance frequency of 0 (sample No. 55), from which it will be understood that the temperature coefficient of the dielectric ceramic according to the present invention can be easily adjusted to approach 0, the dielectric ceramic exhibiting excellent properties when it is used, for example, for a dielectric resonator.

Other materials such as $Ta_2O_5$ may further be added to the ceramic composition of the present invention. In Table 4, the samples that are poorly sintered include those that are cracked, deformed, unsintered, vaporized and poorly sintered in any other form.

EXAMPLE 5

Powders of $BaCO_3$, ZnO, $MgCO_3$, $WO_3$ and $Ta_2O_5$ having purities of not lower than 99% were used as starting materials, weighed at ratios shown in Tables 5, 6 and 7, introduced into a ball mill lined with a rubber together with the water, and were wet-mixed together using $ZrO_2$ balls having a diameter of 10 mm. The mixture was then dehydrated, dried, and was calcined at 1200° C. for two hours. The calcined product was introduced into the ball mill and was wet-pulverized together with the water and an organic binder.

The pulverized product was then dried, granulated through a sieve of mesh #50, and the resulting powder was molded into a disk measuring 12 mm in diameter×8 mm under a pressure of 1 ton/cm². The disk was fired in the open air under the conditions of 1480° to 1600° C. to obtain a ceramic sample which was then machined to obtain a cylinder measuring 8 mm in diameter×5 mm.

The thus obtained ceramic sample was measured for its dielectric constant ($\epsilon r$) at frequencies of 6 to 10 GHz and for its Q-value by a dielectric resonance method. A temperature coefficient ($\tau f$) at resonance frequency was further calculated from a change in the resonance frequency over a temperature range of from 25° C. to 85° C. The Q-value was converted into a Q-value at 1 GHz relying upon a relationship that "Q-value×measuring frequency f=constant" that holds in microwave dielectrics in general. The results were as shown in Tables 5, 6 and 7.

TABLE 4

| Sample | aBaO bZnO cNb$_2$O$_5$ dWO$_3$ eMgO | | | | | Dielectric constant | | Temp. coefficient | Firing temp. |
|---|---|---|---|---|---|---|---|---|---|
| No. | a | b | c | d | e | εr | Q-value | ζf ppm/°C. | °C. |
| 54 | 0.450 | 0.005 | 0.005 | 0.255 | 0.285 | 17.5 | 60000 | −24.4 | 1500 |
| 55 | 0.552 | 0.104 | 0.104 | 0.120 | 0.120 | 28.2 | 176000 | 0 | 1580 |
| 56 | 0.700 | 0.141 | 0.149 | 0.005 | 0.005 | 36.9 | 45000 | 36.8 | 1480 |
| 57 | 0.500 | 0.001 | 0.005 | 0.188 | 0.306 | 16.5 | 115500 | −24.5 | 1600 |
| 58 | 0.508 | 0.017 | 0.017 | 0.241 | 0.217 | 19.0 | 220000 | −24.0 | 1620 |
| 59 | 0.459 | 0.300 | 0.239 | 0.001 | 0.001 | 40.1 | 45000 | 30.0 | 1520 |
| 60 | 0.532 | 0.179 | 0.283 | 0.005 | 0.001 | 39.7 | 77000 | 29.2 | 1540 |
| 61 | 0.522 | 0.045 | 0.023 | 0.198 | 0.212 | 22.4 | 170000 | −16.4 | 1560 |
| 62 | 0.400 | 0.007 | 0.001 | 0.242 | 0.350 | 17.3 | 45000 | −12.4 | 1620 |
| 63 | 0.653 | 0.161 | 0.173 | 0.011 | 0.002 | 37.7 | 66000 | 34.9 | 1500 |
| 64 | 0.571 | 0.137 | 0.149 | 0.074 | 0.069 | 30.3 | 99000 | 10.8 | 1520 |
| 65 | 0.584 | 0.100 | 0.300 | 0.012 | 0.004 | 32.1 | 53000 | 24.1 | 1540 |
| 66 | 0.588 | 0.181 | 0.171 | 0.031 | 0.029 | 36.4 | 113000 | 20.1 | 1500 |
| 67 | 0.490 | 0.009 | 0.001 | 0.340 | 0.160 | 15.0 | 49000 | −21.6 | 1560 |
| *68 | 0.350 | 0.258 | 0.273 | 0.082 | 0.037 | | poorly sintered | | A |
| *69 | 0.750 | 0.011 | 0.044 | 0.097 | 0.098 | | poorly sintered | | A |
| *70 | 0.513 | — | 0.210 | 0.226 | 0.051 | — | <1000 | — | A |
| *71 | 0.554 | 0.350 | 0.052 | 0.022 | 0.022 | — | <1000 | — | A |
| *72 | 0.536 | 0.113 | 0.289 | 0.062 | — | — | <1000 | — | A |
| *73 | 0.538 | 0.004 | 0.005 | 0.005 | 0.450 | | poorly sintered | | A |
| *74 | 0.585 | 0.237 | — | 0.024 | 0.154 | — | <1000 | — | A |
| *75 | 0.503 | 0.142 | 0.350 | 0.002 | 0.003 | | poorly sintered | | A |
| *76 | 0.495 | 0.203 | 0.194 | — | 0.108 | — | <1000 | — | A |
| *77 | 0.430 | 0.003 | 0.007 | 0.390 | 0.170 | | poorly sintered | | A |

Samples marked with * lie outside the scope of the invention.
A: poorly sintered at temp. of lower than 1700° C.

TABLE 5

| Sample No. | aBaO.bZnO.cNb$_2$O$_5$.dWO$_3$.eMgO.fTa$_2$O$_5$ | | | | | | (b + e)/ (c + d + f) | Dielectric constant εr | Q-value | Temperature coefficient of resonance freq. (ppm/°C.) |
| --- | --- | --- | --- | --- | --- | --- | --- | --- | --- | --- |
| | a | b | c | d | e | f | | | | |
| 78 | 0.450 | 0.030 | 0.010 | 0.252 | 0.255 | 0.003 | 1.075 | 19.0 | 73000 | −25.5 |
| 79 | 0.480 | 0.030 | 0.002 | 0.243 | 0.244 | 0.001 | 1.114 | 19.3 | 86000 | −27.7 |
| 80 | 0.517 | 0.035 | 0.035 | 0.206 | 0.197 | 0.010 | 0.924 | 23.1 | 83000 | −20.3 |
| 81 | 0.546 | 0.091 | 0.086 | 0.136 | 0.136 | 0.005 | 1.000 | 28.0 | 88000 | −4.2 |
| 82 | 0.577 | 0.150 | 0.150 | 0.056 | 0.056 | 0.011 | 0.949 | 34.7 | 79000 | +13.5 |
| 83 | 0.600 | 0.185 | 0.195 | 0.010 | 0.005 | 0.005 | 0.905 | 38.0 | 67000 | +27.5 |
| 84 | 0.650 | 0.183 | 0.163 | 0.001 | 0.001 | 0.002 | 1.108 | 35.3 | 70000 | +24.1 |
| 85 | 0.680 | 0.150 | 0.160 | 0.003 | 0.003 | 0.004 | 0.916 | 31.1 | 53000 | +22.3 |
| 86 | 0.520 | 0.050 | 0.005 | 0.194 | 0.194 | 0.037 | 1.034 | 21.6 | 94000 | −27.2 |
| 87 | 0.532 | 0.064 | 0.028 | 0.170 | 0.170 | 0.036 | 1.000 | 25.2 | 91000 | −16.4 |
| 88 | 0.558 | 0.111 | 0.074 | 0.111 | 0.111 | 0.037 | 1.000 | 29.2 | 72000 | −2.6 |
| 89 | 0.581 | 0.163 | 0.124 | 0.046 | 0.047 | 0.039 | 1.005 | 33.9 | 70000 | +10.4 |
| 90 | 0.605 | 0.195 | 0.150 | 0.005 | 0.005 | 0.040 | 1.026 | 37.8 | 69000 | +23.2 |
| 91 | 0.550 | 0.200 | 0.240 | 0.001 | 0.008 | 0.001 | 0.860 | 35.5 | 83000 | +26.3 |
| 92 | 0.540 | 0.250 | 0.200 | 0.001 | 0.002 | 0.007 | 1.212 | 32.1 | 93000 | +28.9 |
| 93 | 0.510 | 0.300 | 0.170 | 0.001 | 0.001 | 0.018 | 1.593 | 32.0 | 85000 | +28.4 |
| 94 | 0.540 | 0.200 | 0.250 | 0.001 | 0.008 | 0.001 | 0.825 | 34.5 | 63000 | +26.3 |
| 95 | 0.510 | 0.170 | 0.300 | 0.001 | 0.001 | 0.018 | 0.538 | 31.3 | 58000 | +27.3 |
| 96 | 0.546 | 0.091 | 0.001 | 0.136 | 0.135 | 0.091 | 0.991 | 24.4 | 215000 | −15.0 |
| 97 | 0.556 | 0.111 | 0.019 | 0.111 | 0.111 | 0.092 | 1.000 | 26.5 | 180000 | −9.6 |
| 98 | 0.571 | 0.143 | 0.048 | 0.071 | 0.071 | 0.096 | 0.995 | 28.2 | 140000 | −1.9 |
| 99 | 0.589 | 0.177 | 0.078 | 0.029 | 0.029 | 0.098 | 1.005 | 30.5 | 135000 | +6.5 |
| 100 | 0.602 | 0.195 | 0.035 | 0.005 | 0.005 | 0.158 | 1.010 | 34.3 | 143000 | +14.6 |
| 101 | 0.464 | 0.030 | 0.003 | 0.250 | 0.250 | 0.003 | 1.094 | 21.9 | 92000 | −29.2 |
| 102 | 0.450 | 0.030 | 0.002 | 0.197 | 0.300 | 0.021 | 1.500 | 19.2 | 61000 | −25.3 |

TABLE 6

| Sample No. | aBaO.bZnO.cNb$_2$O$_5$.dWO$_3$.eMgO.fTa$_2$O$_5$ | | | | | | (b + e)/ (c + d + f) | Dielectric constant εr | Q-value | Temperature coefficient of resonance freq. (ppm/°C.) |
| --- | --- | --- | --- | --- | --- | --- | --- | --- | --- | --- |
| | a | b | c | d | e | f | | | | |
| 103 | 0.451 | 0.030 | 0.002 | 0.300 | 0.215 | 0.002 | 0.806 | 21.0 | 56000 | −24.0 |
| 104 | 0.435 | 0.010 | 0.001 | 0.202 | 0.350 | 0.002 | 1.756 | 21.6 | 53000 | −17.5 |
| 105 | 0.430 | 0.010 | 0.001 | 0.350 | 0.208 | 0.001 | 0.619 | 19.2 | 53000 | −10.3 |
| 106 | 0.577 | 0.150 | 0.005 | 0.057 | 0.057 | 0.154 | 0.958 | 27.8 | 188000 | −6.7 |
| 107 | 0.581 | 0.167 | 0.008 | 0.045 | 0.045 | 0.154 | 1.024 | 28.6 | 174000 | −4.4 |
| 108 | 0.588 | 0.177 | 0.020 | 0.028 | 0.030 | 0.157 | 1.010 | 28.1 | 158000 | −0.8 |
| 109 | 0.595 | 0.191 | 0.030 | 0.012 | 0.012 | 0.160 | 1.005 | 29.2 | 156000 | +2.6 |
| 110 | 0.610 | 0.181 | 0.031 | 0.012 | 0.012 | 0.154 | 0.980 | 31.0 | 159000 | +5.1 |
| 111 | 0.600 | 0.180 | 0.005 | 0.010 | 0.005 | 0.200 | 0.860 | 28.1 | 133000 | +0.0 |
| 112 | 0.550 | 0.190 | 0.003 | 0.004 | 0.003 | 0.250 | 0.751 | 24.4 | 65000 | +3.3 |
| 113 | 0.510 | 0.180 | 0.003 | 0.004 | 0.003 | 0.300 | 0.596 | 23.5 | 53000 | +5.6 |
| 114 | 0.590 | 0.010 | 0.010 | 0.010 | 0.190 | 0.190 | 0.952 | 26.9 | 73000 | +4.5 |
| 115 | 0.550 | 0.010 | 0.005 | 0.015 | 0.250 | 0.170 | 1.368 | 26.2 | 69000 | +3.2 |
| 116 | 0.550 | 0.020 | 0.005 | 0.005 | 0.170 | 0.250 | 0.731 | 27.1 | 93000 | +1.6 |
| 117 | 0.630 | 0.030 | 0.005 | 0.005 | 0.140 | 0.190 | 0.850 | 26.3 | 70000 | +4.1 |
| 118 | 0.550 | 0.015 | 0.210 | 0.015 | 0.207 | 0.003 | 0.974 | 30.5 | 60000 | +30.5 |
| 119 | 0.600 | 0.010 | 0.150 | 0.020 | 0.200 | 0.020 | 1.105 | 28.2 | 61000 | +25.6 |
| 120 | 0.450 | 0.200 | 0.030 | 0.200 | 0.060 | 0.060 | 0.897 | 28.3 | 87000 | −30.3 |
| 121 | 0.500 | 0.240 | 0.010 | 0.240 | 0.009 | 0.001 | 0.992 | 28.0 | 84000 | −41.4 |
| 122 | 0.550 | 0.230 | 0.002 | 0.200 | 0.001 | 0.017 | 1.055 | 26.7 | 80000 | −38.4 |
| 123 | 0.610 | 0.200 | 0.005 | 0.150 | 0.005 | 0.030 | 1.108 | 27.5 | 82000 | −19.8 |
| 124 | 0.599 | 0.201 | 0.095 | 0.007 | 0.007 | 0.091 | 1.078 | 34.3 | 185000 | +14.0 |
| 125 | 0.602 | 0.188 | 0.104 | 0.007 | 0.007 | 0.092 | 0.961 | 33.5 | 187000 | +13.5 |
| 126 | 0.548 | 0.089 | 0.004 | 0.130 | 0.144 | 0.085 | 1.064 | 26.1 | 197000 | −7.5 |
| 127 | 0.591 | 0.195 | 0.017 | 0.001 | 0.001 | 0.195 | 0.920 | 28.9 | 178000 | +2.5 |

TABLE 7

| Sample No. | aBaO.bZnO.cNb$_2$O$_5$.dWO$_3$.eMgO.fTa$_2$O$_5$ | | | | | | (b + e)/ (c + d + f) | Dielectric constant εr | Q-value | Temperature coefficient of resonance freq. (ppm/°C.) |
| --- | --- | --- | --- | --- | --- | --- | --- | --- | --- | --- |
| | a | b | c | d | e | f | | | | |
| 128 | 0.548 | 0.089 | 0.004 | 0.130 | 0.114 | 0.085 | 1.064 | 24.0 | 206000 | −7.9 |
| 129 | 0.578 | 0.174 | 0.001 | 0.027 | 0.030 | 0.190 | 0.936 | 26.9 | 191000 | −4.1 |

TABLE 7-continued

| | aBaO.bZnO.cNb$_2$O$_5$.dWO$_3$.eMgO.fTa$_2$O$_5$ | | | | | | Dielectric | | Temperature coefficient |
|---|---|---|---|---|---|---|---|---|---|
| Sample No. | a | b | c | d | e | f | (b + e)/ (c + d + f) | constant εr | Q-value | of resonance freq. (ppm/°C.) |
| 130 | 0.616 | 0.185 | 0.090 | 0.007 | 0.007 | 0.095 | 1.000 | 33.5 | 199000 | +11.5 |
| 131 | 0.535 | 0.094 | 0.005 | 0.127 | 0.141 | 0.098 | 1.022 | 26.1 | 65000 | −14.7 |
| 132 | 0.558 | 0.107 | 0.100 | 0.114 | 0.114 | 0.007 | 1.000 | 28.0 | 181000 | +29.0 |
| 133 | 0.570 | 0.099 | 0.078 | 0.083 | 0.083 | 0.087 | 0.737 | 28.9 | 188000 | +12.8 |
| 134 | 0.577 | 0.155 | 0.051 | 0.054 | 0.054 | 0.109 | 0.977 | 27.6 | 193000 | −0.3 |
| 135 | 0.587 | 0.177 | 0.025 | 0.026 | 0.026 | 0.159 | 0.967 | 27.3 | 226000 | +0.8 |
| 136 | 0.591 | 0.181 | 0.059 | 0.021 | 0.021 | 0.127 | 0.976 | 28.7 | 188000 | +5.2 |
| 137 | 0.589 | 0.187 | 0.040 | 0.015 | 0.015 | 0.154 | 0.967 | 28.1 | 173000 | +2.4 |
| 138 | 0.593 | 0.203 | 0.071 | 0.005 | 0.005 | 0.123 | 1.045 | 33.0 | 187000 | +8.0 |
| 139 | 0.559 | 0.127 | 0.003 | 0.098 | 0.098 | 0.115 | 1.042 | 25.3 | 120000 | −5.2 |
| 140 | 0.481 | 0.031 | — | 0.243 | 0.244 | 0.001 | 1.127 | 19.5 | 81000 | −26.9 |
| 141 | 0.545 | 0.090 | — | 0.136 | 0.137 | 0.092 | 0.996 | 24.0 | 207000 | −14.5 |
| 142 | 0.577 | 0.174 | — | 0.027 | 0.030 | 0.192 | 0.932 | 26.7 | 186000 | −4.0 |
| *143 | 0.400 | 0.200 | 0.010 | 0.120 | 0.150 | 0.120 | 1.400 | | poorly sintered | |
| *144 | 0.750 | 0.100 | 0.010 | 0.030 | 0.010 | 0.100 | 0.786 | | poorly sintered | |
| *145 | 0.500 | — | 0.150 | 0.100 | 0.150 | 0.100 | 0.429 | <10 | <1000 | not measurable |
| *146 | 0.450 | 0.350 | 0.150 | 0.020 | 0.020 | 0.010 | 2.056 | | poorly sintered | |
| *147 | 0.470 | 0.050 | 0.350 | 0.010 | 0.100 | 0.020 | 0.395 | | poorly sintered | |
| *148 | 0.600 | 0.140 | 0.005 | 0.115 | — | 0.140 | 0.538 | 11.0 | <1000 | not measurable |
| *149 | 0.450 | 0.001 | 0.110 | 0.001 | 0.400 | 0.038 | 2.691 | | poorly sintered | |
| *150 | 0.630 | 0.100 | 0.050 | — | 0.100 | 0.120 | 1.176 | 16.1 | 27000 | −5.6 |
| *151 | 0.450 | 0.040 | 0.030 | 0.400 | 0.050 | 0.030 | 0.196 | | poorly sintered | |
| *152 | 0.570 | 0.020 | 0.200 | 0.208 | 0.002 | — | 0.054 | 15.3 | <1000 | not measurable |
| *153 | 0.500 | 0.040 | 0.040 | 0.030 | 0.040 | 0.350 | 0.190 | | poorly sintered | |

Samples marked with * lie outside the scope of the invention.

According to Tables 5, 6 and 7, the samples Nos. 143 to 153 whose compositions fell outside the scope of the present invention were poorly sintered and exhibited small dielectric constants and small Q-values. On the other hand, the samples of the present invention exhibited dielectric constants of 19 to 38, Q-values of 50000 to 230000, and temperature coefficients τf at resonance frequency of −42 to +31 ppm/°C.

EXAMPLE 6

Powders of BaCO$_3$, Y$_2$O$_3$, ZnO, Nb$_2$O$_5$, WO$_3$ and Ta$_2$O$_5$ having purities of not lower than 99% were used as starting materials, weighed at ratios shown in Table 7, introduced into a ball mill lined with a rubber together with the water, and were wet-mixed together using ZrO$_2$ balls having a diameter of 10 mm. The mixture was then dehydrated, dried, and was calcined at 1200° C. for two hours. The Calcined product was introduced into the ball mill and was wet-pulverized together with the water and an organic binder.

The pulverized product was then dried, granulated through a sieve of mesh #50, and the resulting powder was molded into a disk measuring 12 mm in diameter×11 mm under a pressure of 1 ton/cm$^2$. The disk was fired in the open air under the conditions of 1450° to 1550° C. to obtain a ceramic sample which was then machined to obtain a cylinder measuring 13 mm in diameter×7 mm.

The thus obtained ceramic sample was measured for its dielectric constant (εr) at frequencies of 4 to 7 GHz and for its Q-value by a dielectric resonance method. A temperature coefficient (τf) at resonance frequency was further calculated from a change in the resonance frequency over a temperature range of from 25° C. to 85° C. The Q-value was converted into a Q-value at 1 GHz relying upon a relationship that "Q-value×measuring frequency f=constant" that holds in microwave dielectrics in general. The results were as shown in Table 8.

TABLE 8

| | aBaO.bZnO.cNb$_2$O$_5$.dWO$_3$.eY$_2$O$_3$.fTa$_2$O$_5$ | | | | | | Dielectric | | |
|---|---|---|---|---|---|---|---|---|---|
| Sample No. | a | b | c | d | e | f | (b + e)/ (c + d + f) | constant εr | Q-value | τf ppm/°C. |
| 154 | 0.400 | 0.350 | 0.001 | 0.240 | 0.009 | — | 1.490 | 24.7 | 45000 | −12 |
| 155 | 0.450 | 0.285 | 0.009 | 0.245 | 0.001 | 0.010 | 1.083 | 24.3 | 57000 | −38 |
| 156 | 0.550 | 0.120 | 0.080 | 0.120 | 0.100 | 0.030 | 0.957 | 29.5 | 65000 | 64 |
| 157 | 0.700 | 0.005 | 0.145 | 0.005 | 0.140 | 0.005 | 0.935 | 31.1 | 42000 | 115 |
| 158 | 0.500 | 0.303 | 0.001 | 0.185 | 0.009 | 0.002 | 1.660 | 25.0 | 46000 | −42 |
| 159 | 0.510 | 0.215 | 0.015 | 0.245 | 0.015 | — | 0.885 | 26.4 | 73000 | −41 |
| 160 | 0.460 | 0.001 | 0.228 | 0.009 | 0.300 | 0.002 | 1.259 | 37.3 | 43000 | 161 |
| 161 | 0.510 | 0.225 | 0.020 | 0.205 | 0.020 | 0.020 | 1.000 | 27.2 | 76000 | −23 |
| 162 | 0.520 | 0.045 | 0.095 | 0.195 | 0.045 | 0.100 | 0.231 | 28.8 | 81000 | 3 |
| 163 | 0.517 | 0.042 | 0.049 | 0.200 | 0.042 | 0.150 | 0.211 | 29.0 | 79000 | 0 |
| 164 | 0.640 | 0.002 | 0.245 | 0.001 | 0.112 | — | 0.463 | 35.2 | 56000 | 133 |
| 165 | 0.570 | 0.070 | 0.145 | 0.075 | 0.135 | 0.005 | 0.911 | 30.2 | 64000 | 119 |
| 166 | 0.575 | 0.004 | 0.300 | 0.011 | 0.100 | 0.010 | 0.324 | 35.8 | 45000 | 140 |

TABLE 8-continued

| | aBaO.bZnO.cNb$_2$O$_5$.dWO$_3$.eY$_2$O$_3$.fTa$_2$O$_5$ | | | | | | Dielectric | | |
|---|---|---|---|---|---|---|---|---|---|
| Sample No. | a | b | c | d | e | f | (b + e)/ (c + d + f) | constant $\varepsilon$r | Q-value | $\zeta$f ppm/°C. |
| 167 | 0.590 | 0.030 | 0.169 | 0.030 | 0.180 | 0.001 | 1.050 | 34.1 | 77000 | 156 |
| 168 | 0.490 | 0.155 | 0.001 | 0.339 | 0.010 | 0.005 | 0.478 | 21.6 | 43000 | −45 |
| 169 | 0.520 | 0.045 | 0.005 | 0.190 | 0.045 | 0.195 | 0.231 | 35.8 | 45000 | 140 |
| 170 | 0.625 | 0.002 | 0.005 | 0.013 | 0.105 | 0.250 | 0.399 | 34.1 | 77000 | −45 |
| 171 | 0.535 | 0.145 | 0.002 | 0.008 | 0.010 | 0.300 | 0.500 | 21.6 | 43000 | −45 |
| 172 | 0.520 | 0.045 | — | 0.200 | 0.045 | 0.190 | 0.231 | 27.0 | 58000 | −4 |
| 173 | 0.510 | 0.220 | — | 0.210 | 0.040 | 0.020 | 1.130 | 26.8 | 65000 | −24 |
| *174 | 0.350 | 0.040 | 0.270 | 0.090 | 0.250 | — | 0.806 | 32.9 | 18000 | — |
| *175 | 0.750 | 0.100 | 0.040 | 0.095 | 0.010 | 0.005 | 0.786 | 22.5 | 5000 | — |
| *176 | 0.510 | 0.050 | 0.200 | 0.220 | — | 0.020 | 0.114 | not measurable | | — |
| *177 | 0.530 | 0.020 | 0.050 | 0.020 | 0.350 | 0.030 | 3.700 | 19.4 | 3000 | — |
| *178 | 0.500 | — | 0.230 | 0.060 | 0.110 | 0.100 | 0.282 | 22.3 | 1000 | — |
| *179 | 0.525 | 0.450 | 0.005 | 0.005 | 0.005 | 0.010 | 22.750 | not measurable | | — |
| *180 | 0.565 | 0.155 | — | 0.030 | 0.230 | 0.020 | 7.700 | not measurable | | — |
| *181 | 0.500 | 0.005 | 0.350 | 0.005 | 0.135 | 0.005 | 0.389 | 21.9 | 11000 | — |
| *182 | 0.495 | 0.005 | 0.200 | — | 0.200 | 0.100 | 0.683 | 23.0 | 21000 | — |
| *183 | 0.430 | 0.070 | 0.005 | 0.390 | 0.005 | 0.100 | 0.152 | not measurable | | — |
| *184 | 0.405 | 0.120 | 0.005 | 0.005 | 0.065 | 0.400 | 0.451 | 22.7 | 4000 | — |

Samples marked with * lie outside the scope of the invention.

According to Table 8, the samples Nos. 174 to 184 whose compositions fell outside the scope of the present invention were poorly sintered, or could not be measured for their dielectric constants or Q-values, or exhibited small Q-values. On the other hand, the samples of the present invention exhibited dielectric constants of 21 to 37 and Q-values of 42000 to 81000.

The present inventors have further prepared a starting powder to which are added oxides of Ba, Y, Nb and Ta or metal salts such as carbonates and nitrates that form oxides upon firing, as well as oxides of Ba, Zn and W or metal salts of carbonates or nitrates that form oxides upon firing separately from each other, and have pulverized and calcined them separately from each other, introduced the calcined products into a ball mill, mixed and pulverized them together with a solvent and an organic binder, molded the mixture, and fired the molded article in an open atmosphere. The inventors have confirmed that excellent dielectric properties are exhibited provided the compositions lie within the scope of the present invention.

We claim:

1. A dielectric ceramic composition for high-frequency applications comprising a composite oxide which contains at least Ba, Zn and W as metal elements, wherein when a composition formula of these metal elements by a molar ratio is expressed as aBaO.bZnO.cWO$_3$, said a, b and c satisfy the following relationships, $0.40 \leq a \leq 0.55$ $0.15 \leq b \leq 0.39$ $0.20 \leq c \leq 0.30$ $a+b+c=1.00$.

2. A ceramic composition according to claim 1, wherein said a, b and c lie within the following ranges, $0.43 \leq a \leq 0.53$ $0.20 \leq b \leq 0.35$ $0.22 \leq c \leq 0.28$.

3. A ceramic composition according to claim 1 or 2, wherein said composite oxide is of a polycrystalline form or of a single crystalline form forming, as a main crystal phase, a perovskite-type crystal phase represented by a composition formula Ba(Zn$_{1/2}$W$_{1/2}$)O$_3$.

4. A dielectric ceramic composition for high-frequency applications comprising a composite oxide which contains at least Ba, Zn, Nb and W as metal elements, wherein when a composition formula of these metal elements by a molar ratio is expressed as aBaO.bZnO.cNb$_2$O$_5$.dWO$_3$, said a, b, c and d satisfy the following relationships, $0.40 \leq a \leq 0.70$ $0.10 \leq b \leq 0.35$ $0 < c \leq 0.30$ $0 < d \leq 0.35$ $0.14 \leq c+d \leq 0.36$ $a+b+c+d=1.00$.

5. A ceramic composition according to claim 4, wherein said a, b, c and d lie within the following ranges, $0.44 \leq a \leq 0.63$ $0.16 \leq b \leq 0.35$ $0 < c \leq 0.30$ $0.003 < d \leq 0.25$.

6. A ceramic composition according to claim 4 or 5, wherein said composite oxide is of a polycrystalline form or of a single crystalline form forming the perovskite-type crystal phase as a main crystal phase.

7. A dielectric ceramic composition for high-frequency applications comprising a composite oxide which contains at least Ba, Zn, Nb, W and Ta as metal elements, wherein when a composition formula of these metal elements by a molar ratio is expressed as aBaO.bZnO.cNb$_2$O$_5$.dWO$_3$.eTa$_2$O$_5$, said a, b, c, d and e satisfy the following relationships, $0.40 \leq a \leq 0.70$ $0.10 \leq b \leq 0.35$ $0 < c \leq 0.30$ $0 < d \leq 0.35$ $0 < e \leq 0.30$ $0.16 \leq c+e \leq 0.31$ $a+b+c+d+e=1.00$.

8. A ceramic composition according to claim 7, wherein said a, b, c, d and e lie within the following ranges, $0.44 \leq a \leq 0.63$ $0.16 \leq b \leq 0.35$ $0 < c \leq 0.30$ $0.003 < d \leq 0.25$ $0 < e \leq 0.30$.

9. A ceramic composition according to claim 7 or 8, wherein said composite oxide is of a polycrystalline form or of a single crystalline form forming the perovskite-type crystal phase as a main crystal phase.

10. A dielectric ceramic composition for high-frequency applications comprising a composite oxide which contains at least Ba, Zn, Nb, W and Mg as metal elements, wherein when a composition formula of these metal elements by a molar ratio is expressed as $aBaO \cdot bZnO \cdot cNb_2O_5 \cdot dWO_3 \cdot eMgO$, said a, b, c, d and e satisfy the following relationships, $0.40 \leq a \leq 0.70$ $0 < b \leq 0.30$ $0 < c \leq 0.30$ $0 < d \leq 0.35$ $0 < e \leq 0.35$ $a+b+c+d+e=1.00$.

11. A ceramic composition according to claim 10, wherein said a, b, c, d and e lie within the following ranges, $0.43 \leq a \leq 0.67$ $0.02 \leq b \leq 0.27$ $0.02 \leq c \leq 0.27$ $0.005 \leq d \leq 0.32$ $0.025 \leq e \leq 0.32$.

12. A ceramic composition according to claim 10 or 11, wherein said composite oxide is of a polycrystalline form or of a single crystalline form forming the perovskite-type crystal phase as a main crystal phase.

13. A dielectric ceramic composition for high-frequency applications comprising a composite oxide which contains at least Ba, Zn, Nb, W, Mg and Ta as metal elements, wherein when a composition formula of these metal elements by a molar ratio is expressed as $aBaO \cdot bZnO \cdot cNb_2O_5 \cdot dWO_3 \cdot eMgO \cdot fTa_2O_5$, said a, b, c, d, e and f satisfy the following relationships, $0.43 \leq a \leq 0.68$ $0.01 \leq b \leq 0.30$ $0 \leq c \leq 0.30$ $0 < d \leq 0.35$ $0 < e \leq 0.35$ $0 < f \leq 0.30$ $0.50 \leq (b+e)/(c+d+f) \leq 1.60$ $a+b+c+d+e+f=1.00$.

14. A ceramic composition according to claim 13, wherein said a, b, c, d, e and f lie within the following ranges, $0.52 \leq a \leq 0.62$ $0.08 \leq b \leq 0.21$ $0.001 \leq c \leq 0.11$ $0.001 \leq d \leq 0.150$ $0.001 \leq e \leq 0.150$ $0.08 \leq f \leq 0.20$.

15. A ceramic composition according to claim 13 or 14, wherein said composite oxide is of a polycrystalline form or of a single crystalline form forming the perovskite-type crystal phase as a main crystal phase.

16. A dielectric ceramic composition for high-frequency applications comprising a composite oxide which contains at least Ba, Zn, Nb, W, Y and Ta as metal elements, wherein when a composition formula of these metal elements by a molar ratio is expressed as $aBaO \cdot bZnO \cdot cNb_2O_5 \cdot dWO_3 \cdot eY_2O_3 \cdot fTa_2O_5$, said a, b, c, d, e and f satisfy the following relationships, $0.40 \leq a \leq 0.70$ $0 < b \leq 0.35$ $0 \leq c \leq 0.30$ $0 < d \leq 0.35$ $0 < e \leq 0.30$ $0 \leq f \leq 0.30$ $0.20 \leq (b+e)/(c+d+f) \leq 1.66$ $a+b+c+d+e+f=1.00$.

17. A ceramic composition according to claim 16, wherein said a, b, c, d, e and f lie within the following ranges, $0.45 \leq a \leq 0.65$ $0.010 \leq b \leq 0.30$ $0.010 \leq c \leq 0.25$ $0.010 \leq d \leq 0.30$ $0.010 \leq e \leq 0.25$ $0 \leq f \leq 0.25$.

18. A ceramic composition according to claim 16 or 17, wherein said composite oxide is of a polycrystalline form or of a single crystalline form forming the perovskite-type crystal phase as a main crystal phase.

* * * * *